(12) United States Patent
Tanaka et al.

(10) Patent No.: US 6,339,967 B1
(45) Date of Patent: Jan. 22, 2002

(54) VIBRATION DAMPENING HYPOID GEAR STRUCTURE

(75) Inventors: Hiroaki Tanaka; Osamu Ogawa; Yoshimi Kajitani; Kei Takakuwa, all of Toyota; Toshiki Ohshima, Anjo; Katsutoshi Mizuno, Anjo; Naohito Ino, Anjo; Shigeo Ishihara, Anjo, all of (JP)

(73) Assignees: Toyota Jidosha Kabushiki Kaisha, Toyota; Nissei Corporation, Anjo, both of (JP)

( * ) Notice: Subject to any disclaimer, the term of this patent is extended or adjusted under 35 U.S.C. 154(b) by 0 days.

(21) Appl. No.: 09/703,843

(22) Filed: Nov. 2, 2000

Related U.S. Application Data

(62) Division of application No. 09/168,942, filed on Oct. 9, 1998, now Pat. No. 6,170,349.

(30) Foreign Application Priority Data

Oct. 13, 1997 (JP) .............................. 9-279241
Dec. 9, 1997 (JP) ............................. 9-339141

(51) Int. Cl.⁷ .............................................. F16H 55/18
(52) U.S. Cl. ...................... 74/409; 74/388 PS; 74/443
(58) Field of Search ........................... 74/388 PS, 420, 74/416, 417, 422, 411, 409, 424.5, 458, 461, 443; 180/443, 444, 446

(56) References Cited

U.S. PATENT DOCUMENTS

| | | | |
|---|---|---|---|
| 4,328,879 A | * 5/1982 | Tone | 180/219 |
| 4,719,813 A | 1/1988 | Chalik | 74/409 |
| 5,165,495 A | 11/1992 | Fujii | 180/79.1 |
| 5,182,960 A | 2/1993 | Chary et al. | |
| 5,257,543 A | 11/1993 | Fogelberg | 74/440 |
| 5,743,145 A | 4/1998 | Terada et al. | 74/409 |
| 5,813,335 A | 9/1998 | Burke et al. | 74/409 |
| 5,870,928 A | 2/1999 | Genter et al. | 74/440 |

FOREIGN PATENT DOCUMENTS

| | | |
|---|---|---|
| DE | 41 09 920 A1 | 10/1991 |
| JP | U-2-127842 | 10/1990 |
| JP | A-6-200987 | 7/1994 |
| JP | A-07-232651 | 9/1995 |
| JP | A-07-232653 | 9/1995 |

OTHER PUBLICATIONS

Yu. A. Vil'Chinskii, "Design Layouts of Closed Geartrains in the Kinematics of Industrial Robots", 1323 Sovient Engineering Research, 11 (1991) No. 5, pp. 29–31.

* cited by examiner

*Primary Examiner*—David Fenstermacher
(74) *Attorney, Agent, or Firm*—Oliff & Berridge, PLC

(57) ABSTRACT

The invention concerns a hypoid gear structure which includes a hypoid ring gear disposed coaxially with a rotation axis and a hypoid pinion gear provided with a rotation axis of an electric motor and engaging with the hypoid ring gear. The hypoid gear includes a first toothed portion disposed on the inner side and a second toothed portion disposed on the outer side, and one of the first toothed portion and the second toothed portion is urged by a spring to press the hypoid pinion gear.

3 Claims, 9 Drawing Sheets

VIBRATION DAMPENING HYPOID GEAR STRUCTURE

This application is a divisional of application Ser. No. 09/168,942 filed Oct. 9, 1998.

BACKGROUND OF THE INVENTION

1. Field of the Invention

The present invention relates to a hypoid gear structure, and more particularly, relates to a hypoid gear structure having an excellent abnormal-sound prevention property.

2. Description of the Related Art

A technique for using a hypoid gear is a motor-driven power steering device is known. In such a technique, the hypoid gear is disposed as a decelerating mechanism between a rotation axis of an electric motor for providing an auxiliary force for steering and an output axis of a steering system. The rotation axis of the electric motor and the output axis of the steering system are coupled with each other by the hypoid gear structure which functions as a decelerating mechanism.

One problem of the above conventional motor-driven power steering device is that it is difficult to appropriately set a backlash produced at the engaging portion of gears in the hypoid gear structure.

For example, Japanese Laid-Open Publication No. 7-232651 discloses that such a backlash produced at the engaging portion of the gears can be appropriately controlled by adjusting the position at which a hypoid ring gear is attached in the vertical direction.

In the conventional hypoid gear structure described in the above-mentioned publication, the engagement between the hypoid ring gear and a hypoid pinion gear is adjusted so that an appropriate backlash is obtained at a correct meshed position between the hypoid ring gear and the hypoid pinion gear. This allows for smooth engagement therebetween. However, if the hypoid gear structure receives a vibration and the like from the side of the tires (from the road surface), an abnormal sound such as a tooth striking sound may be generated due to a backlash even if the backlash is within an appropriate range.

SUMMARY OF THE INVENTION

The hypoid gear structure of this invention includes: a hypoid ring gear disposed coaxially with a rotation axis; and hypoid pinion gear provided with a rotation axis of an electric motor and engaging with the hypoid ring gear, wherein the hypoid ring gear includes a first toothed portion disposed on the inner side and a second toothed portion disposed on the outer side, and one of the first toothed portion and the second toothed portion is urged by a spring to press the hypoid pinion gear.

In one embodiment of the invention, the one of the first toothed portion and the second toothed portion is shaped so as to be in a correct engagement with the hypoid pinion gear in a state where the one of the first toothed portion and the second toothed portion is meshed with the hypoid pinion gear with the spring being bent.

In another embodiment of the invention, the first toothed portion is urged by the spring to press the hypoid pinion gear, and the first toothed portion is coupled with the second toothed portion via the spring.

In still another embodiment of the invention, an outer periphery of the first toothed portion is shaped so as to be kept apart from an inner periphery of the second toothed portion.

In still another embodiment of the invention, the spring is a plate spring having a ring portion, and a rotation regulating portion for regulating the rotation of the plate spring with respect to the second toothed portion is formed at an inner periphery of the plate spring.

In still another embodiment of the invention, the first toothed portion is made of a resin.

In still another embodiment of the invention, the first toothed portion is formed on a pedestal disposed on the spring by insert molding.

Alternatively, the hypoid gear structure of this invention includes: a hypoid ring gear disposed coaxially with a rotation axis; and a hypoid pinion gear provided with a rotation axis of an electric motor and engaging with the hypoid ring gear, wherein the hypoid ring gear includes a concave portion, and the concave portion is filled with a vibration-absorbing material.

Alternatively, the hypoid gear structure of this invention includes: a hypoid ring gear disposed coaxially with a rotation axis; and a hypoid pinion gear provided with a rotation axis of an electric motor and engaging with the hypoid ring gear, wherein the hypoid ring gear includes concave portions formed alternately in a predetermined direction.

In one embodiment of the invention, the concave portions are filled with a vibration-absorbing material.

In another embodiment of the invention, the tooth flank of the first toothed portion and the tooth flank of the second toothed portion form a continuous tooth flank in a state where the one of the first toothed portion and the second toothed portion is meshed with the hypoid pinion gear with the spring being bent.

Thus, the invention described herein makes possible the advantage of providing a hypoid gear structure which can reduce the generation of an abnormal sound such as a tooth striking sound due to a vibration received from the road surface.

These and other advantages of the present invention will become apparent to those skilled in the art upon reading and understanding the following detailed description with reference to the accompanying figures.

BRIEF DESCRIPTION OF THE DRAWINGS

FIG. 2A is a plan view, FIG. 2B is a sectional view, and FIG. 2C is an enlarged partial sectional view of a main portion of the hypoid gear structure.

FIG. 4A is a partial sectional view of a main portion of a hypoid ring gear, and FIG. 4B is a partial sectional view of a main portion of the hypoid gear structure.

FIG. 5A is a plan view of a plate spring, FIG. 5B is a plan view of a hypoid ring gear, FIG. 5C is a sectional view of the hypoid ring gear, and FIG. 5D is an enlarged partial sectional view of a main portion of the hypoid ring gear.

FIG. 6A is a partial plan view of a main portion of a hypoid ring gear, and FIG. 6B is a bottom view of the hypoid ring gear.

FIG. 7A is a sectional view of a main portion of a hypoid ring gear, and FIG. 7B is a sectional view of a main portion of an alternative hypoid ring gear.

FIG. 8A illustrates the tooth contact of an outer ring gear and an inner ring gear, and FIGS. 8B illustrates the tooth contact of the inner ring gear.

FIG. 9A illustrates the tooth contact of an outer ring gear and an inner ring gear, and FIG. 9B illustrates the tooth contact of the inner ring gear.

DESCRIPTION OF THE PREFERRED EMBODIMENTS

Hereinbelow, the present invention will be described by way of example with reference to the accompanying drawings.

Figure 1:
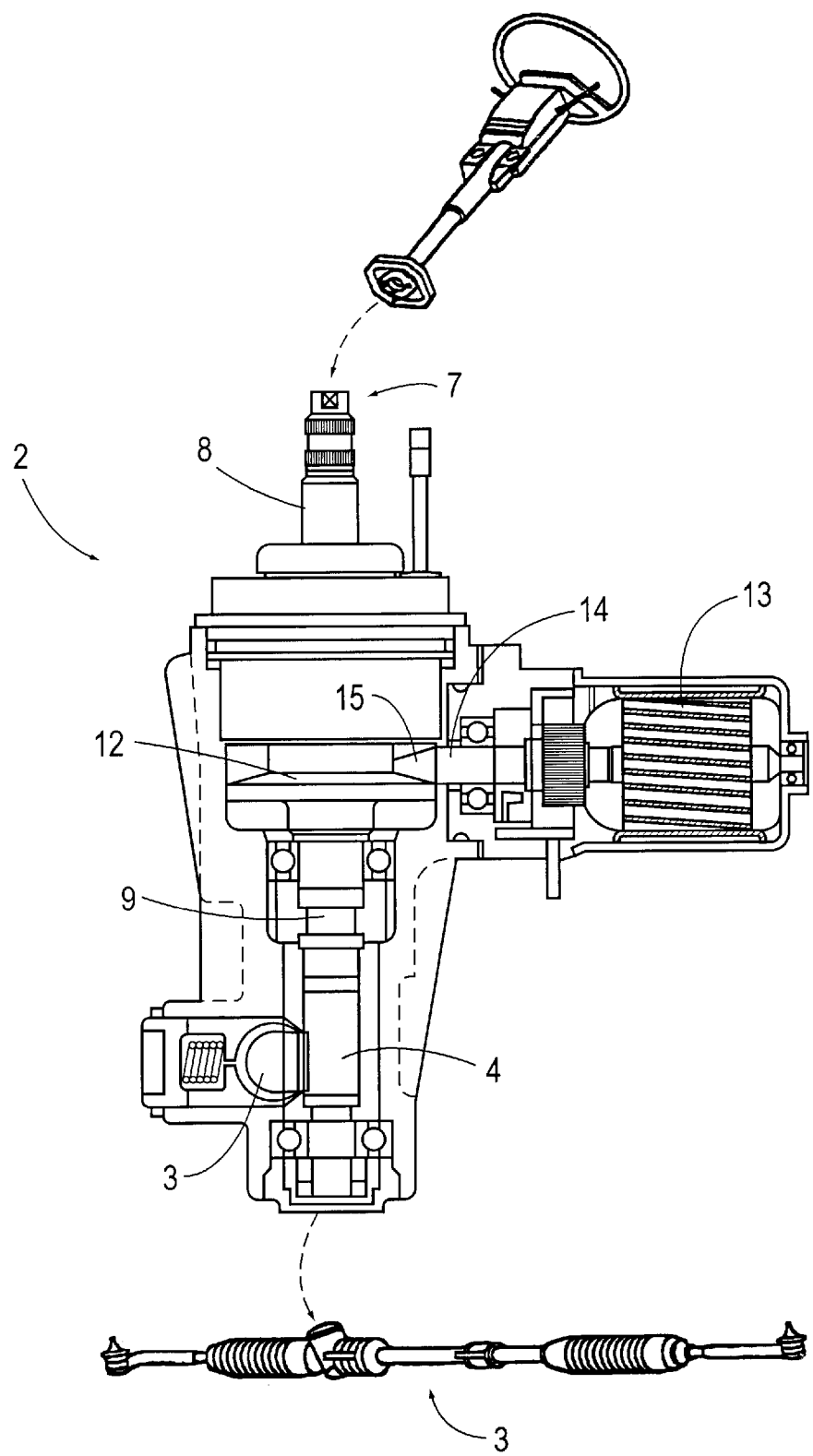
FIG. 1 is a structural view of a motor-driven power steering device including a hypoid gear structure according to the present invention.

FIG. 1 illustrates a motor-driven power steering device including a hypoid gear structure according to the present invention.

A motor-driven power steering device 2 includes a steering shaft 7 and a rack axis 3. The rotation of the steering shaft 7 is converted into a movement in the axial direction of the rack axis 3 via the engagement between a pinion gear 4 disposed coaxially with the steering shaft 7 and the rack axis 3. Wheels (not shown) are coupled with both ends of the rack axis 3 via a shaft coupling (not shown) and a tie-rod (not shown). The wheels are steered rightward and leftward as the rack axis 3 moves in the axial direction.

The steering shaft 7 includes an input axis 8 coupled with the side of a steering wheel (not shown) and an output axis 9 coupled with the side of the sheels (not shown).

A hypoid ring gear 12 is disposed coaxially with the output axis 9, and engages with a hypoid pinion gear 15 provided with a rotation axis 14 of an electric motor 13.

Figure 2A:
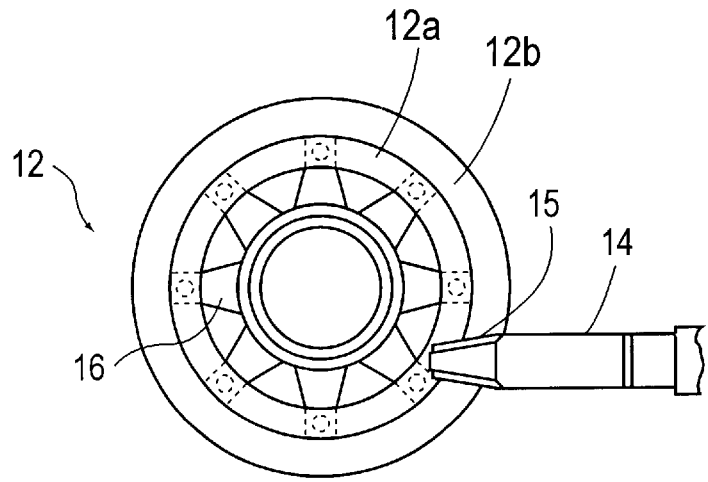
FIGS. 2A to 2C are views illustrating a first example of the hypoid gear structure, where
Figure 2B:
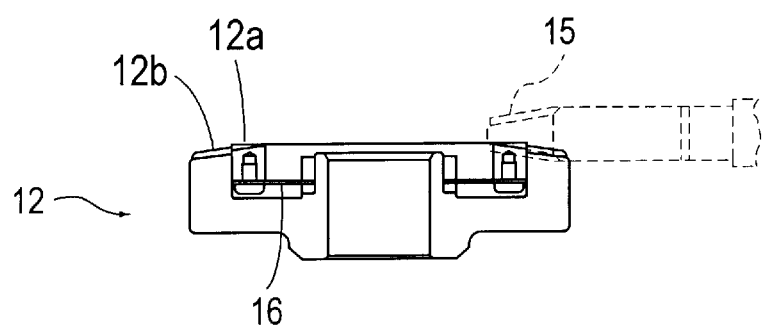
Figure 2C:
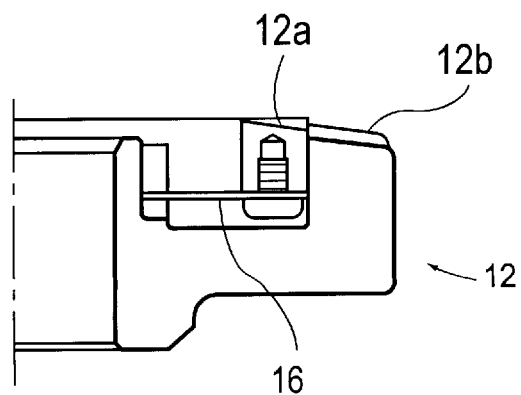

FIGS. 2A to 2C illustrate a first example of the hypoid gear structure according to the present invention. FIGS. 2A and 2B are a plan view and a sectional view, respectively, of the hypoid gear structure, and FIG. 2C is an enlarged partial sectional view of a main portion of the hypoid gear structure.

The hypoid ring gear 12 includes an inner ring gear 12a on the inner side and an outer ring 12b on the outer side. The inner ring gear 12a is disposed on the inner periphery of the outer ring gear 12b with a plate spring 16. The inner ring gear 12a is disposed so that the tooth flank thereof somewhat projects from the tooth flank of the outer ring gear 12b before the hypoid ring gear 12 and the hypoid pinion gear 15 are meshed, as shown in FIG. 2C. Once the hypoid pinion gear 15 and the inner ring gear 12a have engaged with each other, the hypoid pinion gear 15 presses the inner ring gear 12a downward. In other words, the inner ring gear 12a engages with the hypoid pinion gear 15 while being pressed against the hypoid pinion gear 15 by an urging force of the plate spring 16.

With this arrangement, if a vibration is received from the side of the tires (from the road surface), i.e., from the side of the output axis, the vibration energy is absorbed by bending the plate spring 16 via the inner ring gear 12a. This reduces the generation of an abnormal sound such as a tooth striking sound due to a vibration and the like received from the side of the tires (from the road surface). Since the spring-urged gear is located on the inner side, the gear can be made small.

The inner ring gear 12a may be made of a resin, a copper alloy, or a steel, depending on the usages of the hypoid gear structure.

Figure 3:
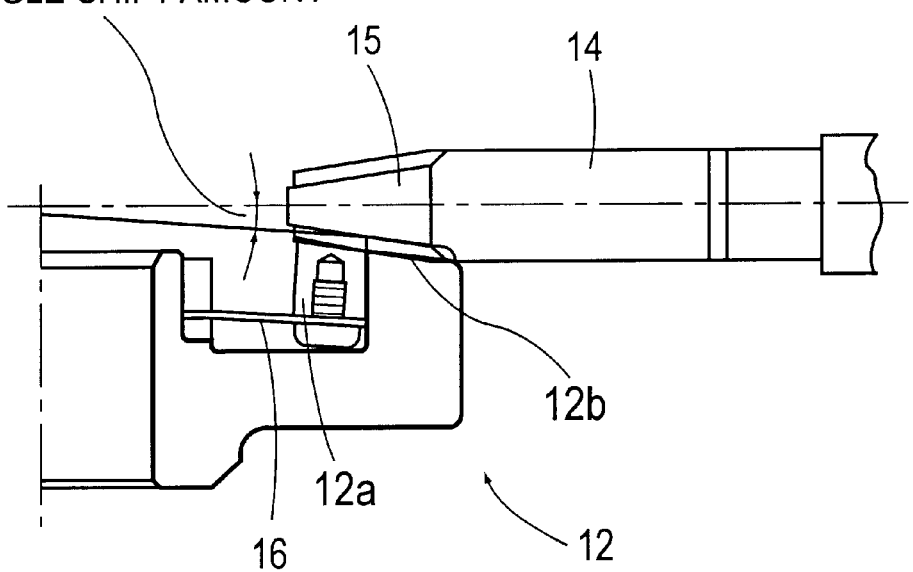
FIG. 3 is a view illustrating a second example of the hypoid gear structure.

FIG. 3 illustrates a second example of the hypoid gear structure according to the present invention. In the engagement with the hypoid pinion gear 15, when the inner ring gear 12a is pressed down and the plate spring 16 is bent, the inner ring gear 12a is in a slanted state in the portion thereof engaging with the hypoid pinion gear 15. That is, the axial angle of the inner ring gear 12a shifts by an angle α. In this example, the tooth cutting process of the inner ring gear 12a is performed by shifting the axial angle of the inner ring gear 12a by the angle α so that the tooth flank of the inner ring gear 12a and the tooth flank of the outer ring gear 12b form a continuous tooth flank when the hypoid ring gear 12 engages with the hypoid pinion gear 15 with this shifted axial angle.

The thus-processed inner ring gear 12a and the outer ring gear 12b constitute one hypoid ring gear having a shape of continuous teeth in the state where the plate spring 16 is bent. That is, the tooth bottom and the tooth crest of the inner ring gear 12a continue with the tooth bottom and the tooth crest of the outer ring gear 12b, respectively, in the state where the plate spring 16 is bent.

Thus, since the tooth flank of the inner ring gear 12a is shaped so as to continue with the tooth flank of the outer ring gear 12b in the state where the plate spring 16 is bent, the inner ring gear 12a engages with the hypoid pinion gear 15 in the state where the tooth flank of the inner ring gear 12a is aligned with the tooth flank of the outer ring gear 12b. This ensures the transmission of the rotation.

Figure 8A:
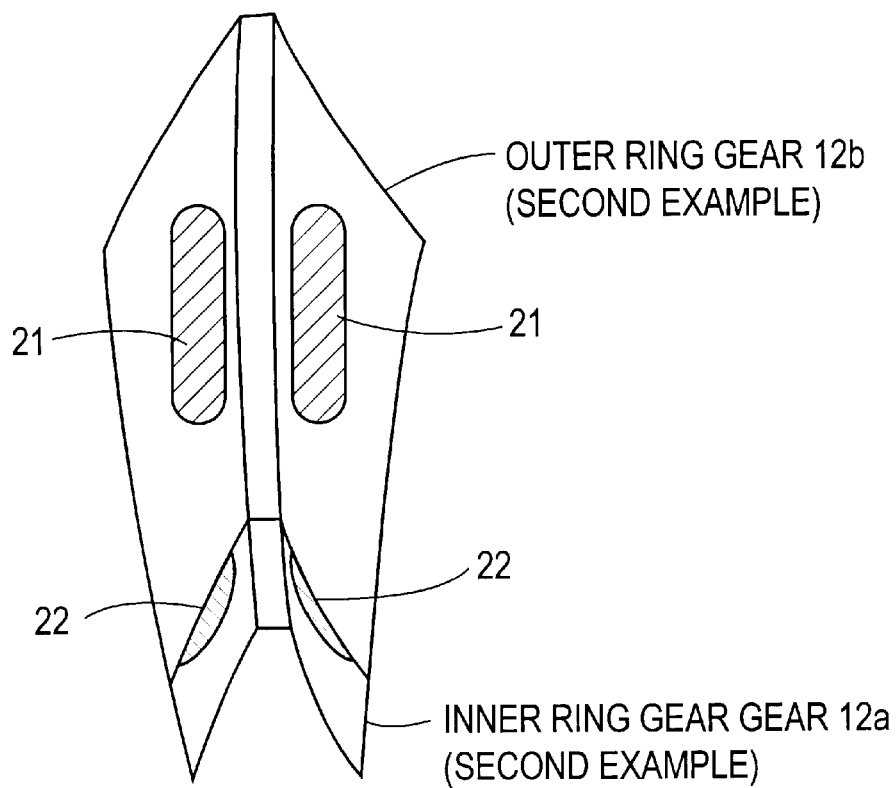
FIGS. 8A and 8B are views illustrating the tooth contact of the hypoid gear structure of the second example, where
Figure 8B:
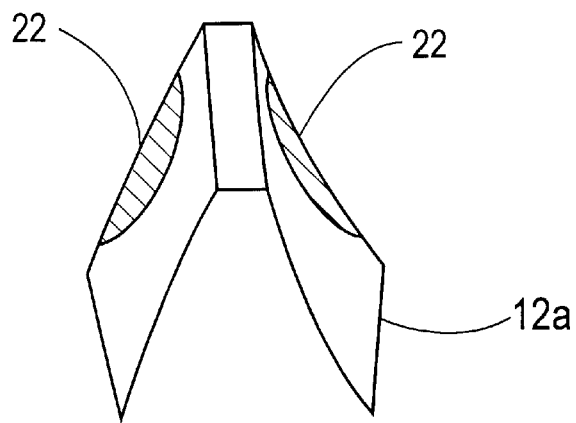

FIGS. 8a and 8B are views for illustrating the tooth contact of the second example of the hypoid gear structure according to the present invention: FIG. 8A illustrates the tooth contact of the inner ring gear 12a and the outer ring gear 12b, while, FIG. 8B illustrates the tooth contact of the inner ring gear 12a .

The spring-urged inner ring gear 12a and the outer ring gear 12b correspond to ones which are obtained by dividing an integrated hypoid gear into an inner portion and an outer portion. When engaging with the hypoid pinion gear 15, therefore, the inner ring gear 12a and the outer ring gear 12b provide the same tooth contact state as that provided by the integrated hypoid gear. As shown in FIG. 8A, the outer ring gear 12b is in contact with the hypoid pinion gear 15 at a contact portion 21.

The portion other than the contact portion 21 is crowned, and is not in contact with the hypoid pinion gear 15. Especially, the inner ring gear 12a which is located farther from the contact portion 21, has a large grinding undercut due to the crowing. By spring-urging the inner ring gear 12a to engage with the hypoid pinion gear 15, therefore, a contact portion 22 is formed on the outer circumference of the inner ring gear 12a, i.e., on the side facing the outer ring gear 12b, causing a tendency for edge contact.

Figure 9A:
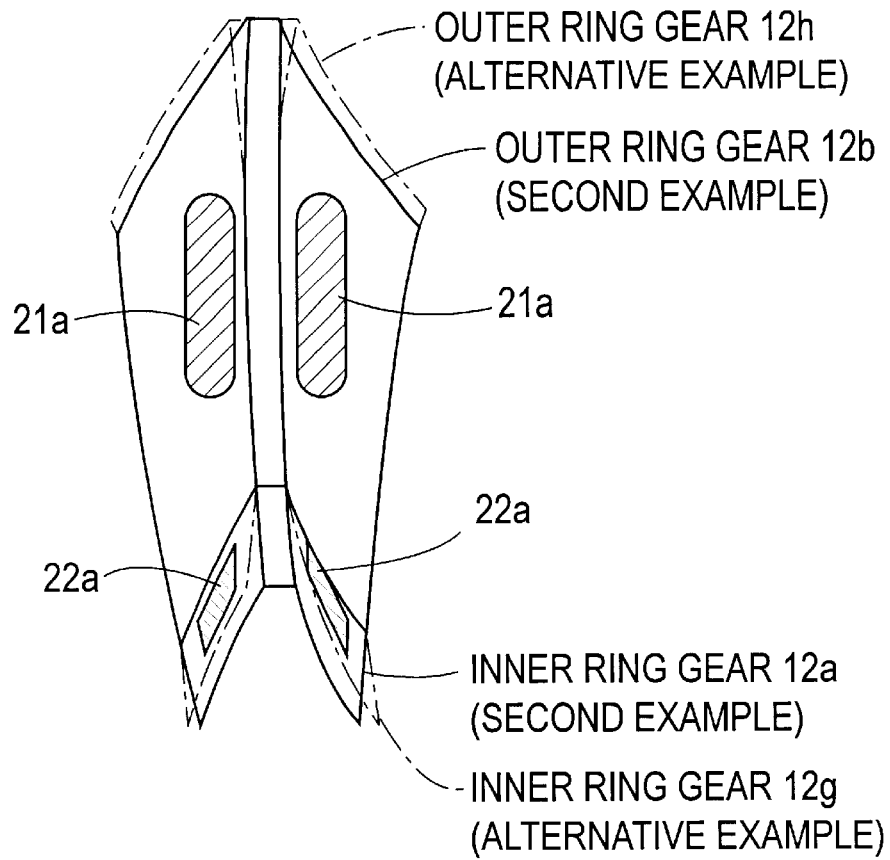
FIGS. 9A and 9B are views illustrating the tooth contact of an alternative hypoid gear structure of the second example, where
Figure 9B:
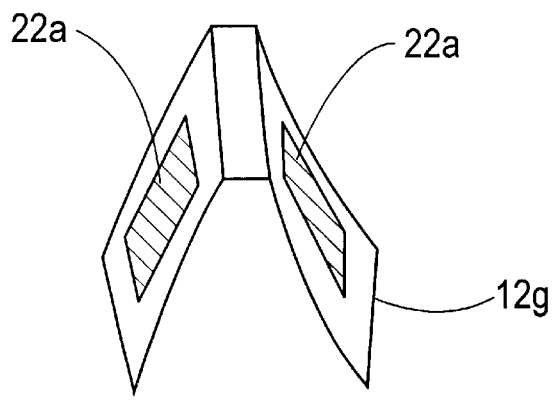

FIGS. 9A and 9B are views for illustrating the tooth contact of an alternative hypoid gear structure of the second example according to the present invention: FIG. 9A illustrates the tooth contact of the inner ring gear 12a and the outer ring gear 12b, while FIG. 9B illustrates the tooth contact of the inner ring gear 12a.

The contact portion 22 described above with reference to FIGS. 8A and 8B is formed by spring-urging the inner ring gear 12a to engage with the hypoid pinion gear 15. This is not a contact portion formed by correct tooth contract.

In order to provide correct tooth contact, an inner ring gear 12g having a shape shown by the one-dot dash line in FIG. 9A may be produced by minutely adjusting the twist angle and the pressure angle in the tooth cutting process. The inner ring gear 12g with this shape can form a contact portion 22a which realizes correct tooth contact with the hypoid pinion gear 15, as shown in FIGS. 9A and 9B. Also, by producing an outer ring gear 12h having a shape shown by one-dot dash line in FIG. 9A, the contact portion is shifted closer to the outer circumference (farther from the inner ring gear) so that the rotational force is mainly transmitted by the outer ring gear.

The shifting of the contact portion of the outer ring gear closer to the outer circumference by changing the shape of the outer ring gear as shown by the one-dot dash line as described above is performed for the purpose of transmitting the rotational force mainly by the outer ring gear. Accordingly, this is applicable to the entirety of the second example of the hypoid gear structure.

Thus, the inner ring gear 12g is shaped so as to be in the correct engagement with the hypoid pinion gear 15 in the state where the plate spring 16 is bent. Accordingly, the engagement of the inner ring gear 12g with the hypoid pinion gear 15 when the inner ring gear 12g is slanted is in a correct engagement state. This further ensures the transmission of the rotation.

Figure 4A:
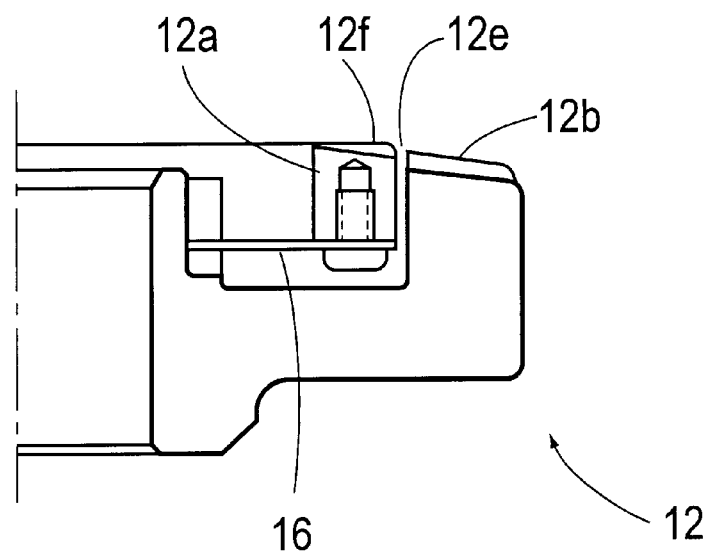
FIGS. 4A and 4B are views illustrating a third example of the hypoid gear structure, where
Figure 4B:
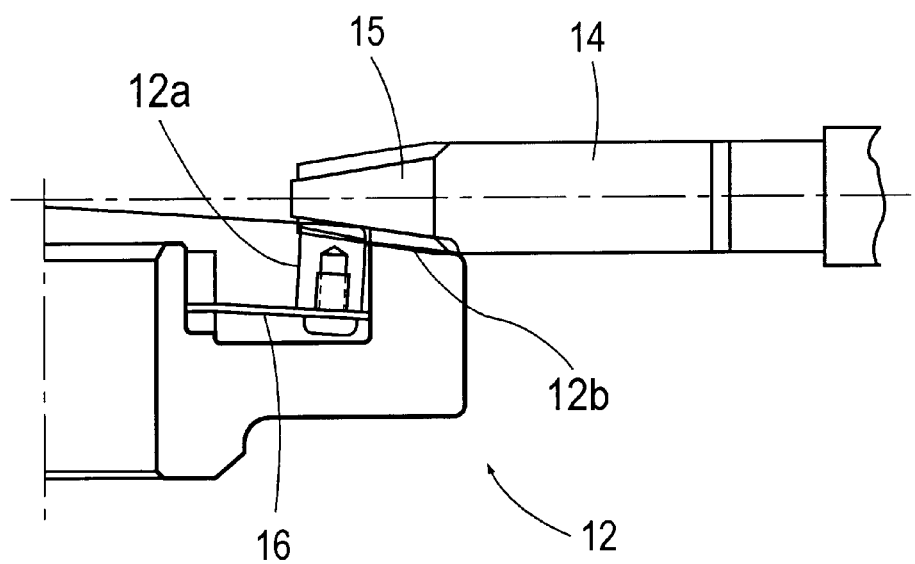

FIGS. 4A and 4B illustrate a third example of the hypoid gear structure according to the present invention: FIG. 4A is a partial sectional view of a main portion of the hypoid ring gear, and FIG. 4B is a partial sectional view of a main portion of the hypoid gear structure.

As described above, the inner ring gear 12a is slanted when the hypoid ring gear 12 and the hypoid pinion gear 15 engage with each other. In order to avoid the inner ring gear 12a and the outer ring gear 12b from interfering with each other at the engagement with the hypoid pinion gear 15, a clearance 12e is provided between the outer periphery of the inner ring gear 12a and the inner periphery of the outer ring gear 12b. The inner ring gear 12a has a round outer periphery 12f so that the clearance 12e remains when the inner ring gear 12a is pressed down and slanted.

Thus, the inner ring gear 12a has the outer periphery which is kept apart from the inner periphery of the outer ring gear 12b. This allows the inner ring gear 12a to the spring-urged to press the hypoid pinion gear 15 without interfering with the outer ring gear 12b. As a result, the inner ring gear 12a and the outer ring gear 12b will not interfere with each other when the plate spring 16 is bent.

Figure 5A:
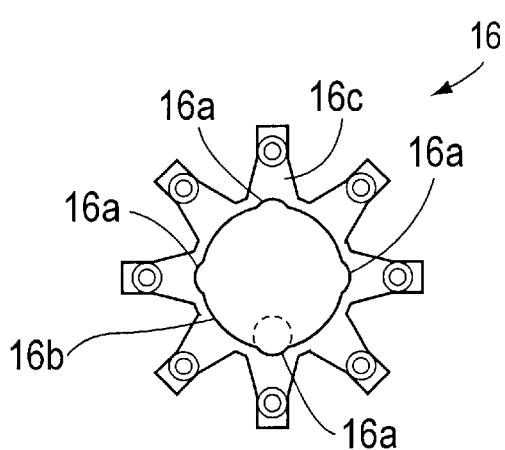
FIGS. 5A to 5D are views illustrating a fourth example of the hypoid gear structure, where
Figure 5B:
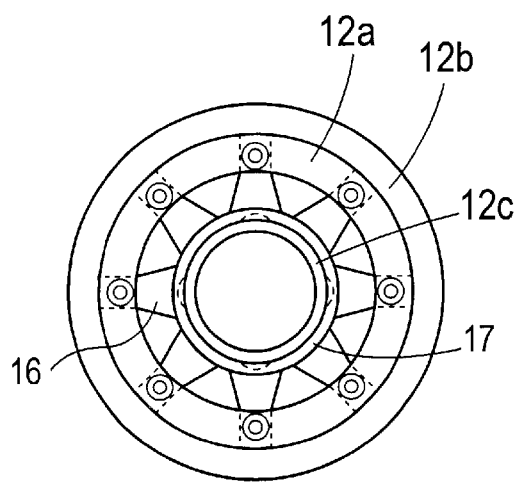
Figure 5C:
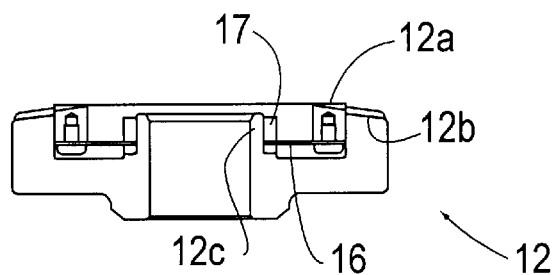
Figure 5D:
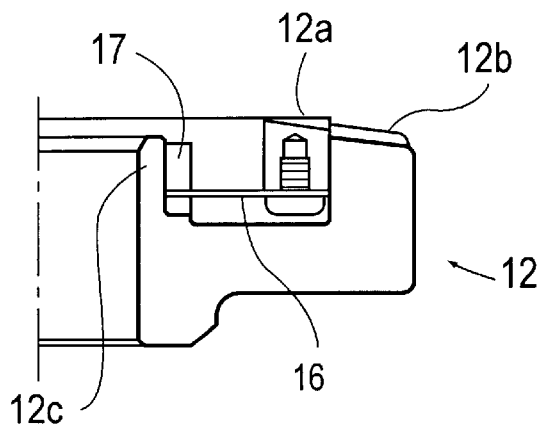

FIGS. 5A to 5D illustrates a fourth example of the hypoid gear structure according to the present invention: FIG. 5A is a plan view of the spring plate 16, FIGS. 5B and 5C are a plan view and a sectional view, respectively, of the hypoid ring gear, and FIG. 5D is a partial sectional view of a main portion of the hypoid ring gear.

As shown in FIGS. 5A, the plate spring 16 includes a ring portion 16b and arms 16c extending in the radial direction. The arms 16c are bent. The plate spring 16 is fixed to the hypoid ring gear 12 by a fit-in ring 17 which is fitted around an axis 12c of the hypoid ring gear by pressure, and held in position by the friction with the fit-in ring 17. Notches 16a are formed at the inner circumference of the plate spring 16. When the fit-in ring 17 is fit around the axis 12c of the hypoid ring gear 12, the fit-in ring 17 plastically deforms due to the notches 16a of the plate spring 16. This provides the effect of preventing the plate spring 16 from rotating.

Thus, the notches 16a are formed at the inner circumference of the plate spring 16 to regulate the rotation of the plate spring 16 relative to the hypoid ring gear 12 as described above. Accordingly, the inner ring gear 12a which is coupled with the body of the hypoid ring gear 12 via the plate spring 16 is kept stable relative to the body of the hypoid ring gear 12. This allows the fixing structure of the plate spring 16 to be simplified.

Figure 6A:
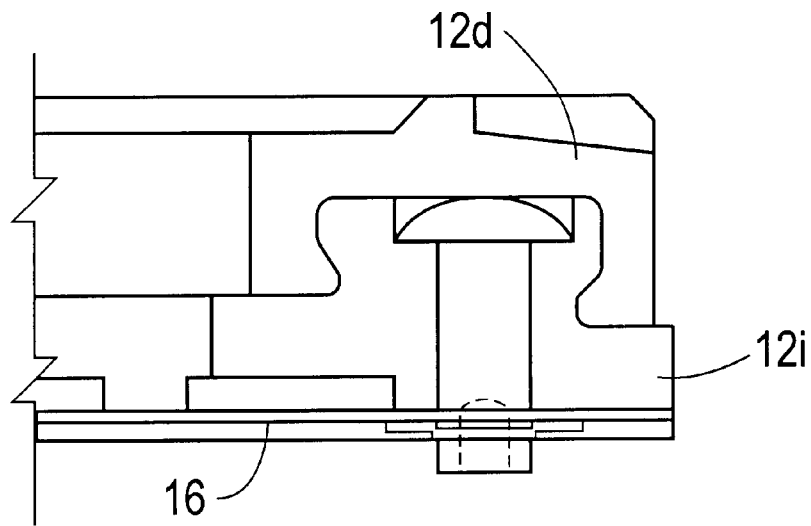
FIGS. 6A and 6B are view illustrating a fifth example of the hypoid gear structure, where
Figure 6B:
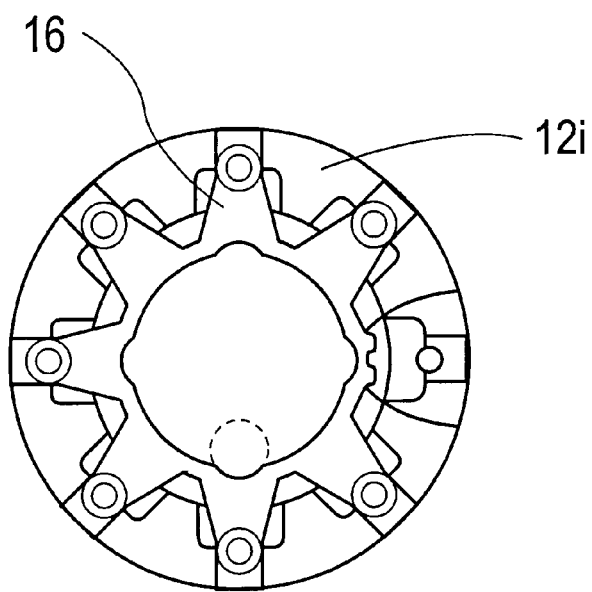

FIGS. 6A and 6B illustrate a fifth example of the hypoid gear structure according to the present invention: FIG. 6A is a partial sectional view of a main portion of the hypoid ring gear, and FIG. 6B is a bottom view of the hypoid ring gear.

In the case where the inner ring gear is made of a resin, since the plate spring (spider spring) must be thin, it cannot be formed by insert molding. In order to solve this problem, the plate spring 16 is fixed to a ring-shaped steel pedestal 12i with a rivet or a screw, and a resin gear 12d is formed on the pedestal 12i by insert molding.

Thus, in this example, the inner ring gear is composed of the resin gear 12d which is formed on the pedestal 12i disposed on the spring plate 16 by insert molding. This allows for the molding of the resin gear having the plate spring. By using the gear made of a resin, the abnormal-sound reduction effect further improves.

In this embodiment, the hypoid gear structure where the inner ring gear on the inner side of the hypoid ring gear is spring-urged to press the hypoid pinion gear has been described. The present invention is not limited to this construction, but the same effect as that described above can also be obtained by a hypoid gear structure where the outer ring gear on the outer side of the hypoid ring gear is spring-urged to press the hypoid pinion gear.

Figure 7A:
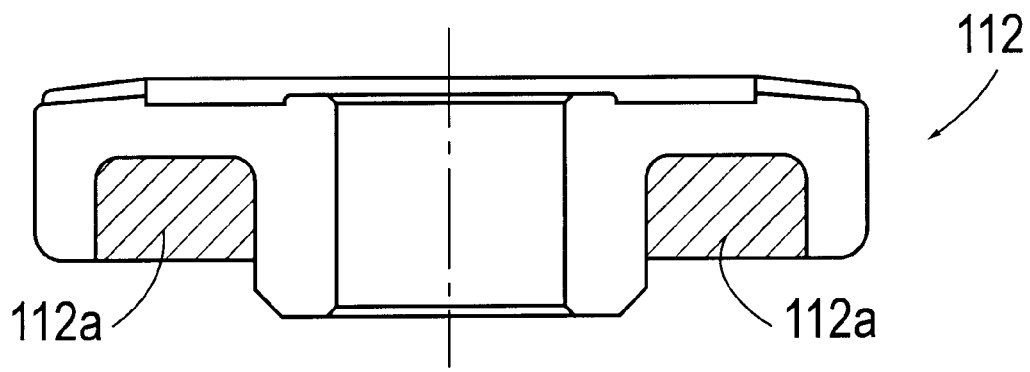
FIGS. 7A and 7B are view illustrating a sixth example of the hypoid gear structure, where
Figure 7B:
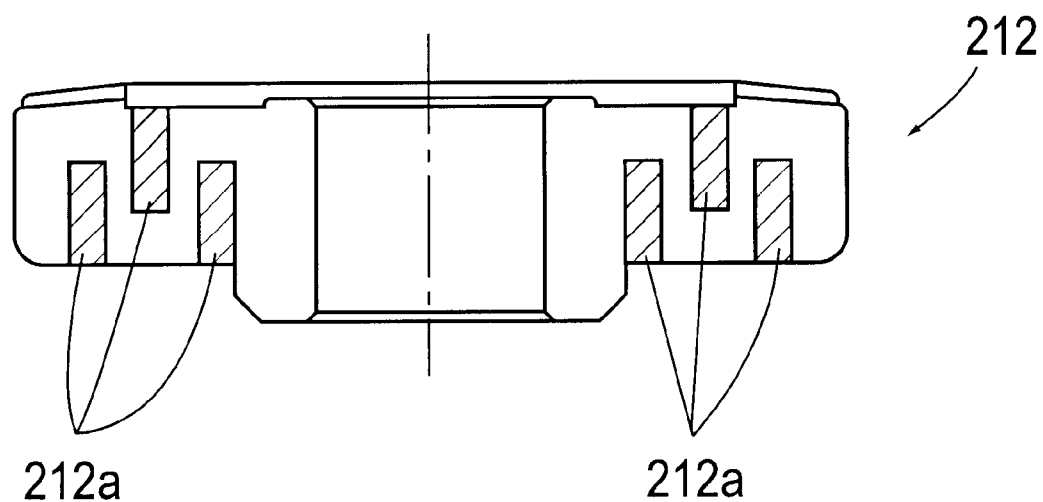

FIGS. 7A and 7B illustrate a sixth example of the hypoid gear structure according to the present invention: FIG. 7A is a partial sectional view of a main portion of a hypoid ring gear, and FIG. 7B is a partial sectional view of a main portion of another hypoid ring gear.

As shown in FIG. 7A, a hypoid ring gear 112 has a concave portion 112a which is filled with a vibration-absorbing material. A resin or rubber, for example, is used as the vibration-absorbing material. This reduces noise from gears, an abnormal sound such as a tooth striking sound due to backlash, and the like.

As shown in FIG. 7B, a hypoid ring gear 212 includes concave portions 212a which are filled with a vibration-absorbing material, formed alternately in the axial direction. A resin or rubber, for example, is used as the vibration-absorbing material. Rubber should desirably have a large attenuation. With this configuration, the abnormal-sound reduction effect provided by the vibration-absorbing material can be further improved since the sound transmission is prolonged and thus the sound is attenuated during the transmission. This reduces noise from gears, a tooth striking sound due to backlash, and the like.

As described above, according to the hypoid gear structure of the present invention, the hypoid ring gear includes the first toothed portion on the inner side and the second toothed portion on the outer side. Either one of the first and second toothed portions is spring-urged to press the hypoid pinion gear.

Accordingly, if the hypoid gear structure receives a vibration from the side of the tires (from the road surface), such a vibration energy is absorbed by on of the first and second toothed portions which is spring-urged to press the hypoid pinion gear. This reduces the generation of noise such as a tooth striking sound due to the vibration received from the side of the tires (from the road surface).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A hypoid gear structure, comprising:

a hypoid ring gear disposed coaxially with a rotation axis and including a first surface and a second surface axially aligned; and a hypoid pinion gear provided with a rotation axis of an electric motor and engaging with the first surface of the hypoid ring gear, wherein the hypoid gear includes a concave portion located in the second surface, and the concave portion is filled with a vibration-absorbing material.

2. A hypoid gear structure, comprising:

a hypoid ring gear disposed coaxially with a rotation axis and including a first surface and a second surface axially aligned; and a hypoid pinion gear provided with a rotation axis of an electric motor and engaging with the first surface of the hypoid ring gear, wherein the hypoid ring gear includes concave portions formed alternately between the first surface and the second surface in a predetermined direction.

3. A hypoid gear structure to claim 2, wherein the concave portions are filled with a vibration-absorbing material.

* * * * *